(12) United States Patent
Subramanian et al.

(10) Patent No.: US 9,311,378 B2
(45) Date of Patent: Apr. 12, 2016

(54) DATA SYNCHRONIZATION BETWEEN A DATA MANAGEMENT SYSTEM AND AN EXTERNAL SYSTEM

(75) Inventors: Manjunath B. Subramanian, Bangalore (IN); Swetha Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1407 days.

(21) Appl. No.: 12/576,611

(22) Filed: Oct. 9, 2009

(65) Prior Publication Data

US 2011/0087632 A1  Apr. 14, 2011

(51) Int. Cl.
*G06F 7/00* (2006.01)
*G06F 17/00* (2006.01)
*G06F 17/30* (2006.01)

(52) U.S. Cl.
CPC .................. *G06F 17/30578* (2013.01)

(58) Field of Classification Search
USPC ............................................ 707/610, 999.1
See application file for complete search history.

(56) References Cited

U.S. PATENT DOCUMENTS

| 6,202,085 | B1 * | 3/2001 | Benson et al. ................. 709/205 |
| 6,604,104 | B1 | 8/2003 | Smith |
| 6,845,383 | B1 * | 1/2005 | Kraenzel et al. ...................... 1/1 |
| 7,120,767 | B2 | 10/2006 | Hara et al. |
| 2003/0149702 | A1 | 8/2003 | Saffer et al. |
| 2005/0004831 | A1 * | 1/2005 | Najmi et al. ..................... 705/10 |
| 2005/0144538 | A1 * | 6/2005 | Lawrence et al. ............... 714/47 |
| 2005/0262194 | A1 * | 11/2005 | Mamou et al. ................ 709/203 |
| 2006/0004854 | A1 * | 1/2006 | Okunseinde ...... G06F 17/30557 |
| 2007/0067349 | A1 * | 3/2007 | Jhaveri ............. G06F 17/30206 |
| 2008/0052316 | A1 | 2/2008 | Rangadass |
| 2008/0281824 | A1 * | 11/2008 | Rangadass et al. ............... 707/8 |
| 2010/0042641 | A1 * | 2/2010 | Kamalakantha et al. ..... 707/102 |

FOREIGN PATENT DOCUMENTS

WO  0229560 A1  4/2002

OTHER PUBLICATIONS

White, Colin, "A Phased Approach to Enterprise Master Data Management," published Jun. 20, 2007, http://www.b-eye-network.com/view/5051.

* cited by examiner

*Primary Examiner* — Kimberly Wilson
(74) *Attorney, Agent, or Firm* — Anthony V. S. England; Terry J. Carroll

(57) ABSTRACT

A method, a system and a computer program of synchronizing data between a data management system and an external system are disclosed. The method includes creating a first database instance and a second database instance using an integration data model. The method further includes synchronizing data between the second database instance and the external system. A services framework is created and the first database instance and the second database instance are interfaced using the services framework which includes an entity definition repository, a change tracking repository, and a data export element. Also disclosed are a system and a computer program for synchronizing data between a data management system and an external system.

20 Claims, 6 Drawing Sheets

DATA SYNCHRONIZATION BETWEEN A DATA MANAGEMENT SYSTEM AND AN EXTERNAL SYSTEM

BACKGROUND OF THE INVENTION

MDM technology (Master Data Management) is used to create a unified and consistent view of enterprise-wide data and is used to make data available to all external systems. MDM system receives data and information from multiple external systems. Typical MDM technologies provide various mechanisms for handling real-time or near-real-time data synchronization with the external systems by tracking data changes during save process and propagating the data changes. This is conventionally done through scheduled jobs, Web services or such other mechanisms.

In the presence of multiple external systems, an MDM system which is not optimally designed to handle highly transactional and volatile data, starts to degrade in performance. Other challenges include limitation of flexibility in scaling an enterprise-wide infra-structure by adding more systems. Currently for each additional external system that is added to the enterprise-wide infrastructure, there needs to be web service or a scheduled job for communicating with the MDM system. MDM systems' communication with the external systems also is typically "same-data-to-all-systems" and this accentuates the performance problem for MDM system. Traditionally, data synchronization with an 'Operational Data Store' (ODS) does "full data" synchronization. This "full data" synchronization can be costly in terms of performance. For some external systems, 'data marts' are used to solve specific business problems. Data marts too use data extraction from MDM, by creating a database model for the business problem of interest. This database model can derive data from multiple sources in the MDM. However, data marts feed only 'downstream' systems and they typically do not derive data from a single source in the MDM. This limits their use to specific business problem they are designed for and also in terms of their flexibility.

BRIEF SUMMARY OF THE INVENTION

Aspects of the invention are directed to a method, a system and a computer program of synchronizing data between a data management system and an external system. According to a first aspect of the invention, a method for synchronizing data between a data management system and an external system is disclosed. The method includes creating a first database instance and a second database instance using an integration data model. The method further includes a step of synchronizing data between the second database instance and the external system.

In a second aspect of the invention, a method of creating a services framework is disclosed. The method includes interfacing the first database instance and the second database instance using the services framework.

A third aspect of the invention discloses that the services framework has the following three components: an entity definition repository, a change tracking repository, and a data export element.

According to a fourth aspect of the invention is disclosed a system for synchronizing data between a data management system and an external system. The system includes a processor configured to create a first database instance and a second database instance using an integration data model. The system further includes a processor to synchronize data between the second database instance and the external system.

In another aspect, the invention discloses a computer program for synchronizing data between a data management system and an external system. The computer program is configured to create a first database instance and a second database instance using an integration data model. The computer program is further configured to synchronize data between the second database instance and the external system.

BRIEF DESCRIPTION OF THE DRAWINGS

Embodiments of the present invention are described in detail below, by way of example only, with reference to the following schematic drawings, where.

DETAILED DESCRIPTION OF THE INVENTION

Aspects of the invention describe, in an example embodiment, synchronization of data from an MDM system with an intermediate data management system and enabling external systems to directly communicate with the intermediate data management system for synchronization of respective data. The object of synchronization is to make data available to various external systems, rather than mere data replication.

Figure 1A:
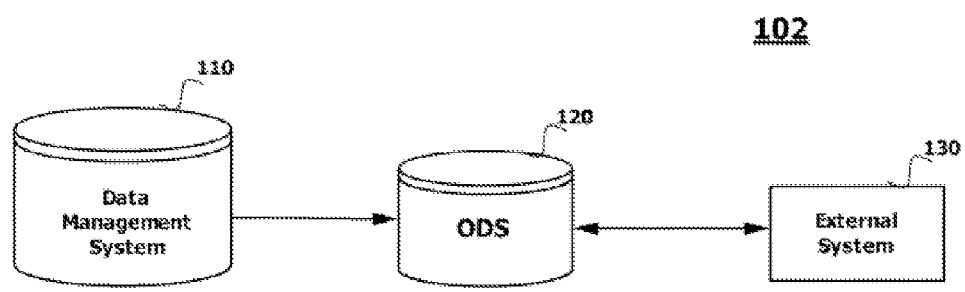
FIG. 1A, FIG. 1B, and FIG. 1C show schematics of currently existing ways of data synchronization and data flow between a data management system and an external system.
Figure 1B:
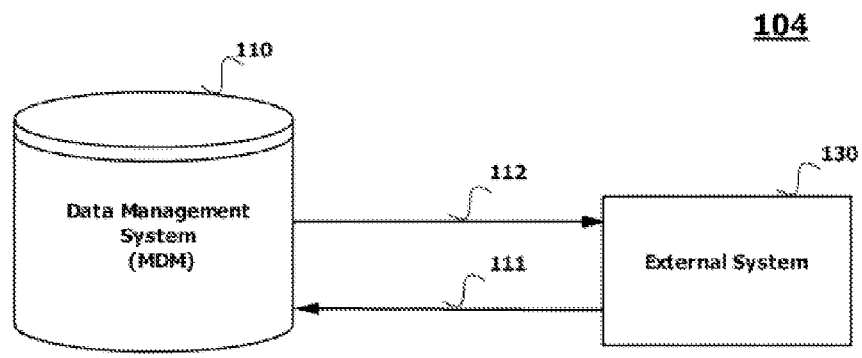
Figure 1C:
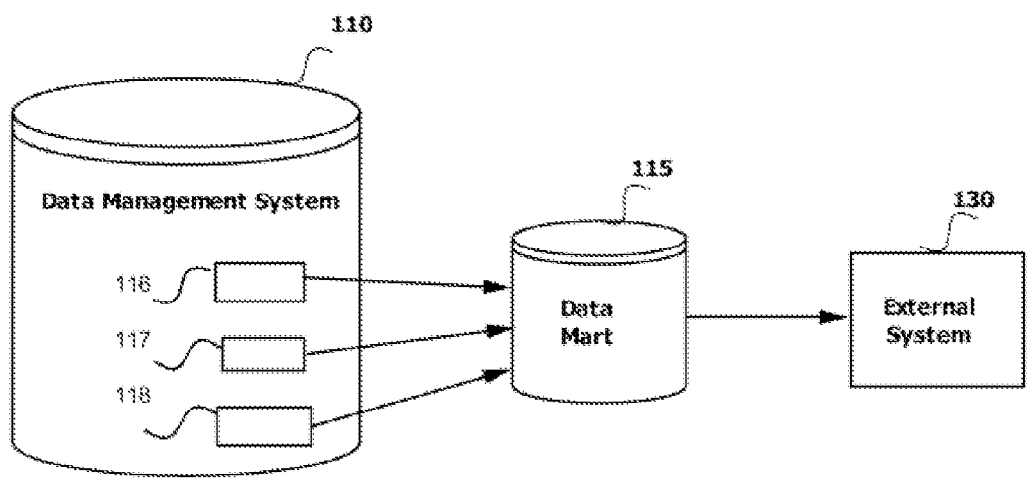

FIG. 1A, FIG. 1B, and FIG. 1C illustrate schematics of data flow and data synchronization between a data management system 110 and an external system 130, already found in prior art.

FIG. 1A shows a prior art schematic 102 for synchronizing data. Schematic 102 includes a data management system 110, an operational data store 120, and an external system 130. Schematic 102 shows synchronization of data between a data management system 110 and an external system 130 via an Operational Data Store (ODS) 120. Typically a "full data" synchronization takes place between the data management system 110 and the ODS 120. Data updates for the external system 130 are retrieved from the ODS 120.

FIG. 1B shows a prior art schematic 104 of data synchronization between a typical MDM system, where the MDM system 110 is an example of the data management system, and the external system 130. Data flow indicated by 111 is typical "upstream" data flow where systems, for example POS (Point of Sale), are feeding data into the MDM system 110. Data flow indicated by 112 is typical "downstream" data flow where data from the MDM system 110 is received by the external system 130. An example of the external system 130 is a reporting system. It is conceivable that a business application indicated by an external system 130 may feed data to the MDM system 110 via 111 as well as receive and consume data from the MDM system 110 via 112. Exchange of data over communication links 111 and 112 typically occurs using such technologies, as, for example, Web services or scheduled jobs.

FIG. 1C shows a schematic 106 of data synchronization between a data management system 110 and an external system 130, via a "data mart" element 115, acting as a staging ground. The data mart element 115 derives data from multiple sources 116, 117 and 118 comprised in the data management system 110. The sources 116, 117 and 118 can be, for example, database tables and database views comprised in the data management system 110. Thus, the data mart element 115 draws portions of data from multiple sources 116-118 and has a schema built to address a small set of business issues. Then, the data drawn from the multiple sources 116-118 is fed downstream to the external system 130.

Figure 2:
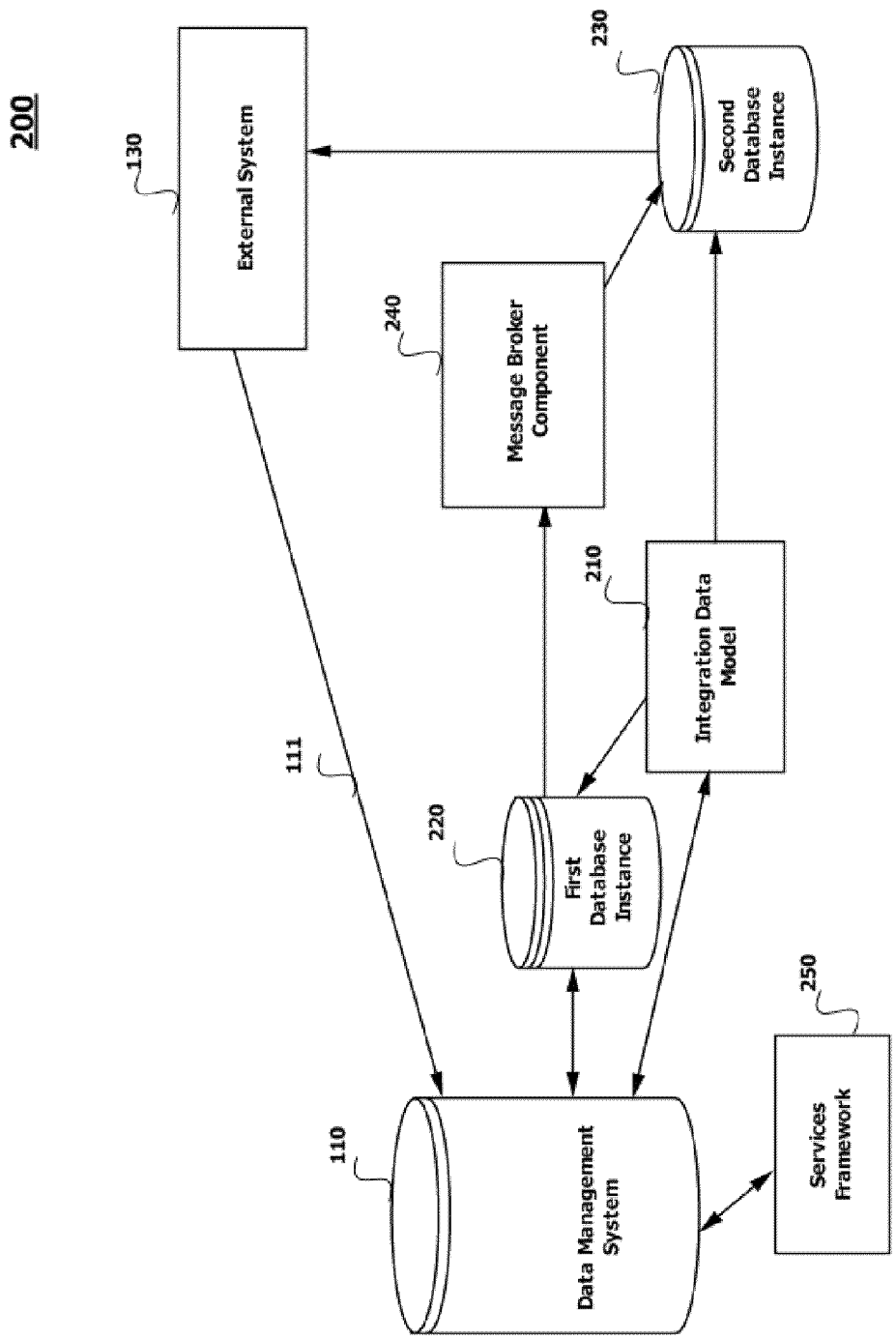
FIG. 2 shows a high-level schematic illustrating synchronization of data between a data management system and an external system according to an example embodiment of the invention.

FIG. 2 shows a high-level system schematic 200 illustrating synchronization of data between the data management system 110 and the external system 130 according to an embodiment of the invention. According to another embodiment of the invention, the data synchronization can be performed between a first system that includes the data management system 110 and a second system, where the second system is one selected from a set including a system configured to feed data to the first system and a system configured to receive data from the first system. In FIG. 2, as an example, the first system is represented by the data management system 110, and as an example of the second system is represented by the external system 130. As one example, the data management system 110 can be an MDM system or as another example, it can be a centralized master repository. Schematic 200 further includes an integration data model 210, a first database instance 220 and a second database instance 230, a services framework 250 and a message broker component 240. In case of the external system 130 not being exclusively "downstream" system, i.e. only consuming the data from the data management system 110, data feed from the external system 130 into the data management system 110 can occur over the communication link 111 as is the case in FIG. 1B.

The integration data model 210 identifies a subset of entities being maintained and managed by the data management system 110 and are identified by business analyses to be advantageous to be synchronized with external systems, one of which is represented by the external system 130. The integration data model 210 considers not only the pre-defined subset of entities but such factors as, for example, volume of data change expected, nature of the change, part of the information that needs to be exported out depending on multiple factors like whether a specific part of an entity changed or whether a group of entities changed and how. This information is used to define the integration data model 210 which captures attributes (data fields) of the identified subset of entities and their relationships, such as, for example, item attributes related to a category or to a location.

Using the integration data model 210, the second database instance 230 is setup and the database schema is created for the second database instance 230. A first database instance 220 is created using a schema that mirrors the schema of the second database instance 230. The first database instance 220 can reside in the data management system 110 or it can also reside outside of the data management system 110 as long as it is functionally coupled to the data management system 110. The integration data model 210 includes metadata information of the pre-defined subset of identified entities and the metadata includes tables and columns definitions for the subset of entities. For example, if it is decided that an item and its item location entities should be exported to the external system 130 from the data management system 110, then it is understood that there are two entities, namely ITEM and ITEM-LOCATION whose attribute information needs to be exported. So in the second database instance 230, definition of two tables mirroring the two entities, ITEM and ITEM-LOCATION is created. The column fields in the two tables should match attribute information of ITEM and ITEM-LOCATION. The columns in these tables will mirror the attribute names and the definitions coming from the data management system 110. The services framework 250 can reside in the data management system 110 or it can reside external to the data management system 110, as long as it is functionally coupled to the data management system 110. The services framework 250 has a plurality of elements, and these elements are described in detail later in FIG. 3. Some of the exemplary functions performed by the elements of the services framework 250 are: to act as a container of a catalog of entities and their attributes of interest identified from the data management system 110, to act as a placeholder to track changes occurring in the entities in the data management system 110, and to facilitate data export from the first database instance 220 to the second database instance 230. The message broker component 240 facilitates the interfacing of the first database instance 220 and the second database instance 230. The message broker component 240 also uses the services framework 250. The message broker component 240 facilitates the interfacing using a message brokering mechanism such as, for example, XML, a scheduled java process or a data call to SQL call conversion mechanism. The external system 130 is configured to communicate with the second database instance 230 via database connectors, such as, for example, open database connectivity ("ODBC"), java database connectivity ("JDBC"), enterprise service bus ("ESB"), to synchronize the data.

Figure 3:
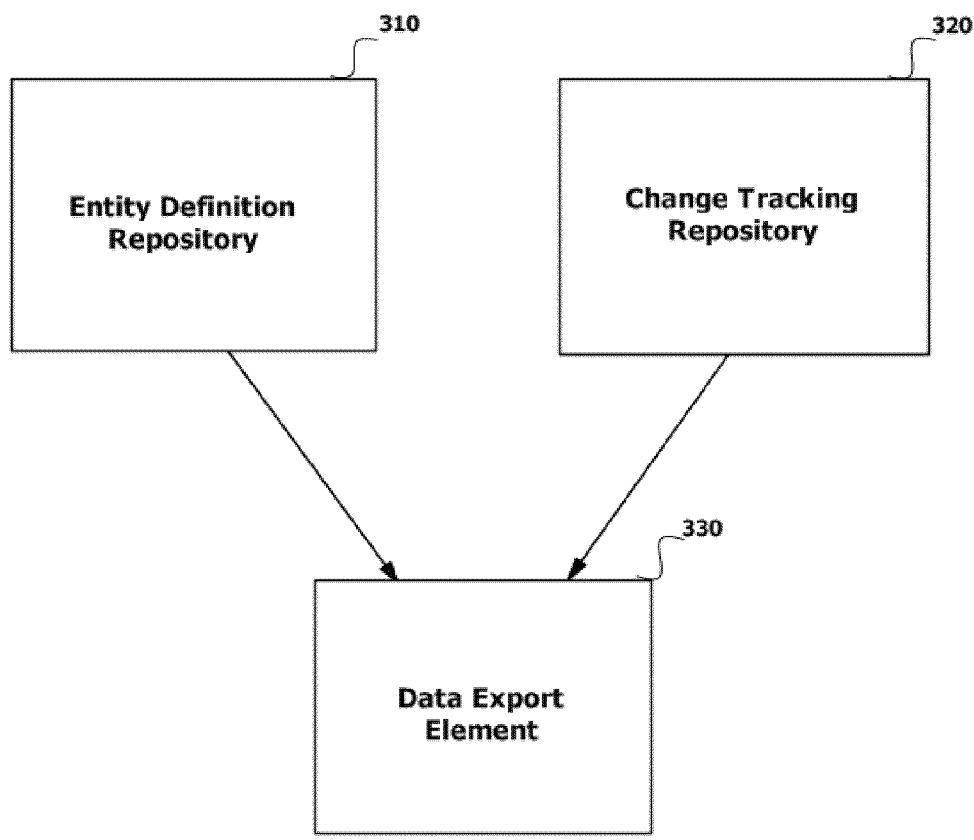
FIG. 3 schematically illustrates further details of a services framework as disclosed in FIG. 2.

FIG. 3 schematically illustrates further details of the services framework 250 (FIG. 2). The services framework 250 has three main components: an entity definition repository 310, a change tracking repository 320 and a data export element 330. The entity definition repository 310 is a placeholder for information and is configured to define the entities and their attribute details. In other words, the entity definition repository 310 is a reference repository that includes metadata of a plurality of entities of the integration data model 210 and the metadata includes attributes and relationships. The change tracking repository 320 is a catalog that functions as a placeholder for a list of changed entities and corresponding metadata of the changed entities within the data management system 110. Post save triggers will be defined for each entity (for example, item, category or item-location) in the data management system 110. Operations such as, for example, ADD/MODIFY/DELETE, carried by a user or by a process are tracked by the post save triggers and the operations create indicators in the change tracking repository 320 marking the entities which have changed along with the date and time, and user information responsible for such changes. The data export element 330 uses the information in the entity definition repository 310 and the change tracking repository 320 to determine which entity has changed and associated data that needs to be exported as part of the entity.

Figure 4:
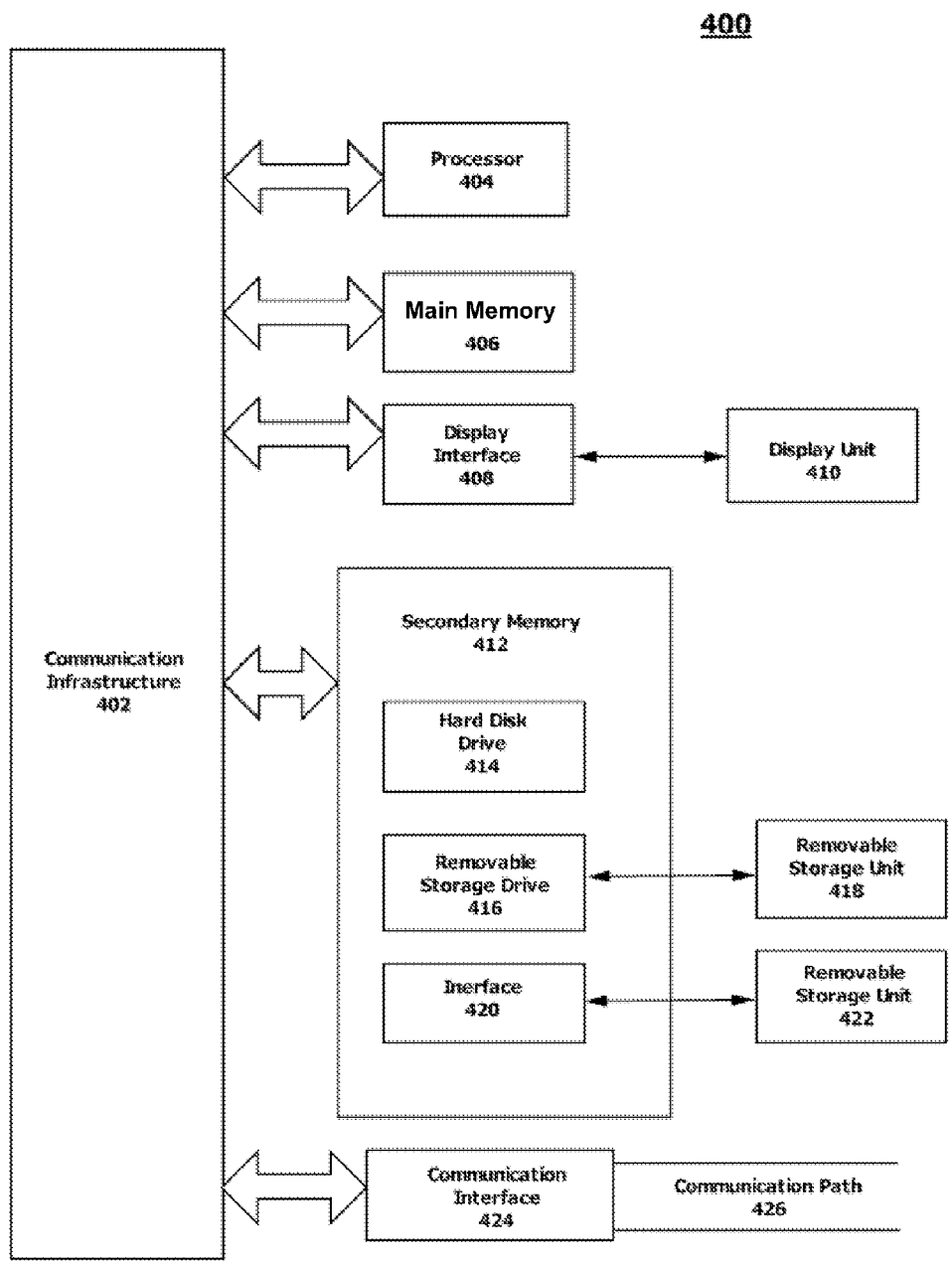
FIG. 4 shows a detailed schematic of a data processing system used for synchronization of data between a data management system and an external system in accordance with an embodiment of the invention.

FIG. 4 is a block diagram of an exemplary computer system 400 that can be used for implementing various embodiments of the present invention. In some embodiments, the computer system 400 can be used as the data management system 110 or the external system 130 or a computer system that is configured to include the first database instance 220 or the second database instance 230 shown in FIG. 2. The Computer system 400 includes a processor 404. It should be understood although FIG. 4 illustrates a single processor, one skilled in the art would appreciate that more than one processor can be included as needed. The processor 404 is connected to a communication infrastructure 402 (for example, a communications bus, cross-over bar, or network) where the communication infrastructure 402 is configured to facilitate communication between various elements of the exemplary computer system 400. Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 configured to forward graphics, text, and other data from the communication infrastructure 402 (or from a frame buffer not shown) for display on a display unit 410. The computer system 400 also includes a main memory 406, which can be random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. The removable storage unit 418, represents, for example, a floppy disk, magnetic tape, optical disk, etc. which is read by and written to by the removable storage drive 416. As will be appreciated, the removable storage unit 418 includes a computer usable storage medium having stored therein computer software and/or data.

In exemplary embodiments, the secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system and external devices. Examples of the communications interface 424 may include a modem, a network interface (such as an Ethernet card), a communications port, a PCM-CIA slot and card, etc. Software and data transferred via the communications interface 424 are in the form of signals which may be, for example, electronic, electromagnetic, optical, or other signals capable of being received by communications interface 424. These signals are provided to the communications interface 424 via a communications path (that is, channel) 426. The channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 406 and the secondary memory 412, the removable storage drive 416, a hard disk installed in the hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in the main memory 406 and/or the secondary memory 412. Computer programs may also be received via the communications interface 424. Such computer programs, when executed, can enable the computer system to perform the features of exemplary embodiments of the present invention as discussed herein. In particular, the computer programs, when executed, enable the processor 404 to perform the features of the computer system 400. Accordingly, such computer programs represent controllers of the computer system.

Figure 5:
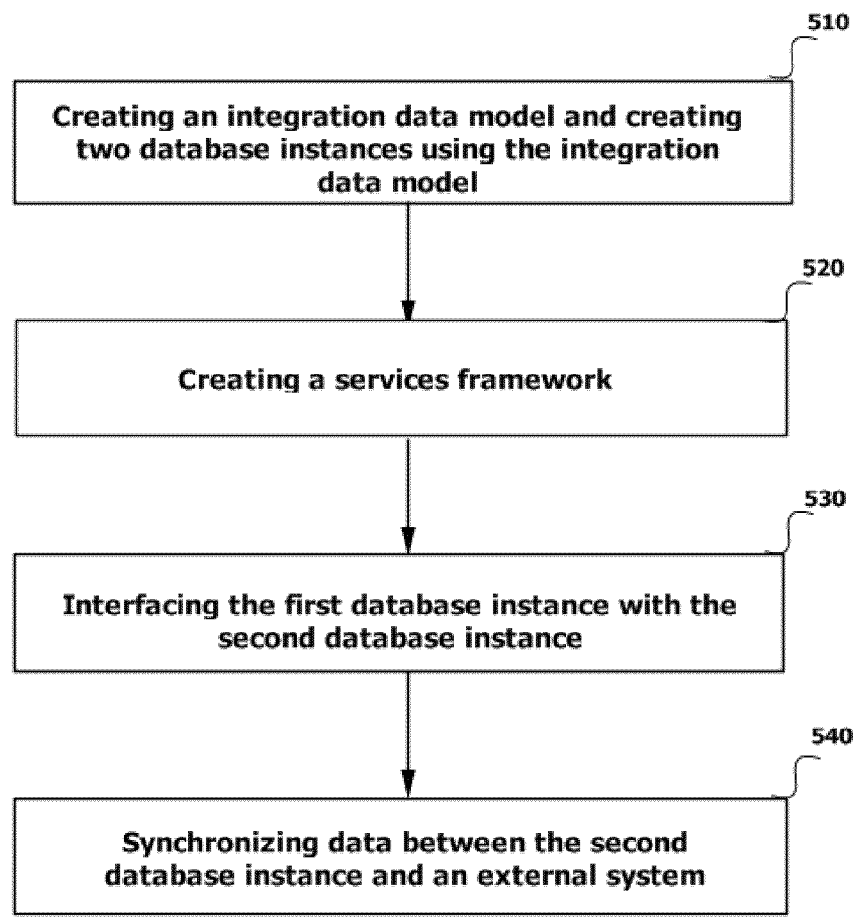
FIG. 5 shows a flow chart for synchronization of data between a data management system and an external system as disclosed in FIG. 2.

FIG. 5, shows a flow chart illustrating a general process 500 for synchronizing data between the data management system 110 (FIG. 1) and the external system 130 (FIG. 2). As depicted in a step 510, an integration data model 210 (FIG. 2) is created using identified subset of entities from the data management system 110. The integration data model 210 is used in creating two database instances. In an exemplary mode, the first database instance 220 is created in the data management system 110 and the second database instance 230 is created external to the data management system 110. Step 520 depicts the creation of the services framework 250 (FIG. 2). The services framework 250 is configured to perform exemplary functions, such as, maintaining information on entities of the integration data model 210, tracking changes in the entities and facilitating export of changes in the entities. In step 530, interfacing of the first database instance 220 with the second database instance 230 using the services framework 250, shown in step 520, is depicted. The services framework 250 uses its components and the integration data model 210, details of which are given in FIG. 2. As shown in step 540, synchronization between the second database instance 230 and the external system 130 is enabled. This synchronization is facilitated via database connectors, such as, for example, ODBC, JDBC, or ESB.

Advantages of various aspects of the invention include low cost, high performance, near real-time data synchronization of the MDM system and the external systems. Typically the intermediate data management system is likely to be more optimized than the MDM system for volatile and transactional data, the performance is improved. Another advantage of some aspects of the invention is that load on the MDM system to synchronize data with the external system is significantly reduced, improving overall performance. Another advantage that some of the embodiments can provide is that as new external systems get added to enterprise-wide infrastructure, creation of new web services or other such mechanisms can be avoided, since the same intermediate data management system can communicate with additional external system through many common communication methods like JDBC, ODBC or ESB.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively embodied by one or more other elements which are not explicitly described as having such functionality/features. Thus, other embodiments need not include the element itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

Embodiments of the invention further provide a storage medium tangibly embodying a program of machine-readable instructions executable by a digital processing apparatus to carry out a method of synchronizing data between a data management system and an external system as described in the various embodiments set forth above and described in detail.

What is claimed is:

1. A method for synchronizing data between a first computer system and a second computer system, wherein the first computer system includes a data management system having data entities, the method comprising:
configuring an integration data model to define a selected subset of the data entities of the data management system according to an expected amount of data change;
creating a first database instance for the first computer system for the subset of the data entities selected responsive to the integration data model and a second database instance for the second computer system for the subset of the data entities selected responsive to the integration data model, wherein creating the first and second database instances includes configuring one of the database instances as a mirror of the other;
creating respective time-based indicators in a change tracking repository responsive to performance of predefined operations on respective ones of the data entities in the selected subset; and
synchronizing data of the subset of the data entities between the first computer system and the second computer system by communicating the data of the subset of the data entities between the first database instance and the second database instance and between the second database instance and the second system, wherein the second system feeds data to and receives data from the first system and wherein the synchronizing is responsive to the indicators in the change tracking repository.

2. The method of claim 1, wherein the integration data model is configured to use a pre-defined subset of data entities of the first system.

3. The method of claim 1, wherein the first system is configured to include the first database instance.

4. The method of claim 1, wherein the synchronizing data between the second database instance and the second system is enabled by a database connector selected from connectors including an open database connectivity connector, an enterprise service bus connector, and a java database connectivity connector.

5. The method of claim 1, further comprising:
creating a services framework; and
interfacing the first database instance and the second database instance using the services framework.

6. The method of claim 5, wherein the interfacing is enabled by a message brokering mechanism selected from a set comprising XML, a scheduled java process, and a data call to SQL call conversion mechanism.

7. The method of claim 5, wherein the services framework is communicatively coupled to the first system.

8. The method of claim 5, wherein the services framework comprises:
an entity definition repository;
the change tracking repository; and
a data export element.

9. The method of claim 8, wherein the entity definition repository includes metadata of a plurality of entities of the integration data model, wherein the metadata comprises attributes and relationships.

10. The method of claim 8, wherein the data export element uses the entity definition repository and the change tracking repository to export changes in entities identified in the change tracking repository.

11. The method of claim 1, wherein the method comprises:
defining operations as triggers for respective data entities of the selected subset of the data entities.

12. A system for synchronizing data between a first computer system and a second computer system, wherein the first computer system includes a data management system having data entities, the system comprising:
an integration data model configured for defining a selected subset of the data entities of the data management system according to an expected amount of data change;
a processing device configured to create a first database instance for the first computer system for the subset of the data entities selected responsive to the integration data model and a second database instance for the second computer system for the subset of the data entities selected responsive to the integration data model, wherein creating the first and second database instances includes configuring one of the database instances as a mirror of the other;
a processing device configured to create respective time-based indicators in a change tracking repository responsive to performance of predefined operations on respective ones of the data entities in the selected subset; and
a processing device configured to synchronize data of the subset of the data entities between the first computer system and the second computer system by communicating the data of the subset of data entities between the first database instance and the second database instance and between the second database instance and the second system, wherein the second system feeds data to and receives data from the first system and wherein the synchronizing is responsive to the indicators in the change tracking repository.

13. The system of claim 12, wherein the processor is further configured to:
create a services framework; and
interface the first database instance and the second database instance using the services framework.

14. The system of claim 13, wherein the interfacing is enabled by a message brokering mechanism selected from a set comprising XML, a scheduled java process, and a data call to SQL call conversion mechanism.

15. The system of claim 13, wherein the services framework comprises:
an entity definition repository;
the change tracking repository; and
a data export element.

16. The system of claim 12, wherein the method comprises:
defining operations as triggers for respective data entities of the selected subset of the data entities.

17. A non-transitory storage medium tangibly embodying a program of machine-readable instructions executable by a digital processing apparatus to carry out a method of synchronizing data between a first computer system and a second computer system, wherein the first computer system includes a data management system having data entities, the storage medium configured with instructions for causing a processor to:
configure an integration data model to define a selected subset of the data entities of the data management system according to an expected amount of data change;
create a first database instance for the first computer system for the subset of the data entities selected responsive to the integration data model and a second database instance for the second computer system for the subset of the data entities selected responsive to the integration data model, wherein creating the first and second database instances includes configuring one of the database instances as a mirror of the other;

create respective time-based indicators in a change tracking repository responsive to performance of predefined operations on respective ones of the data entities in the selected subset; and synchronize data of the subset of the data entities between the first computer system and the second computer system by communicating the data of the subset of data entities between the first database instance and the second database instance and between the second database instance and the second system, wherein the second system feeds data to and receives data from the first system and wherein the synchronizing is responsive to the indicators in the change tracking repository.

18. The storage medium of claim 17 further configured to:
create a services framework; and
interface the first database instance and the second database instance using the services framework.

19. The storage medium of claim 17, wherein the method comprises:
defining operations as triggers for respective data entities of the selected subset of the data entities.

20. A method for synchronizing data between a centralized master repository and an external system, wherein the centralized master repository is functionally coupled to a data management system having data entities, the method comprising:
configuring an integration data model to define a selected subset of the data entities of the data management system according to an expected amount of data change;
creating a first database instance for the first computer system for the subset of the data entities selected responsive to the integration data model and a second database instance for the second computer system for the subset of the data entities selected responsive to the integration data model, wherein creating the first and second database instances includes configuring one of the database instances as a mirror of the other;
creating a services framework, wherein the services framework comprises an entity definition repository, a change tracking repository and a data export element;
interfacing the first database instance and the second database instance using the services framework, wherein the communicating of data between the first database instance and the second database instance includes communicating via the services framework, wherein the change tracking repository comprises a list of changed data entities and corresponding metadata of the changed data entities and wherein the method comprises:
defining operations as triggers for respective data entities of the selected subset of the data entities; and
creating time-based indicators in the change tracking repository when the defined operations are performed on the defined data entities; and
synchronizing data of the subset of the data entities between the first computer system and the second computer system by communicating the data of the subset of the data entities between the first database instance and the second database instance and between the second database instance and the external system wherein the second system feeds data to and receives data from the first system and wherein the synchronizing is responsive to the indicators in the change tracking repository.

\* \* \* \* \*